(12) United States Patent
Aiyama et al.

(10) Patent No.: US 6,368,066 B2
(45) Date of Patent: *Apr. 9, 2002

(54) VACUUM APPARATUS AND FAN CASING WITH WEAR INDICATOR

(75) Inventors: Fumihiko Aiyama, Musashimurayama; Kazunori Takahashi, Kawagoe, both of (JP)

(73) Assignee: Kioritz Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/456,836

(22) Filed: Dec. 7, 1999

(30) Foreign Application Priority Data

Dec. 14, 1998 (JP) .............................................. 10-354697

(51) Int. Cl.[7] .......................... F04B 49/00; F04B 25/00; F04B 35/04; A47L 5/00; F01B 25/26
(52) U.S. Cl. ..................... 417/63; 417/234; 417/423.14; 417/423.2; 415/118; 15/339
(58) Field of Search ............................... 417/234, 423.1, 417/423.14, 423.2, 63; 415/118, 201, 203, 174.4; 15/339

(56) References Cited

U.S. PATENT DOCUMENTS

| | | | | |
|---|---|---|---|---|
| 3,257,076 A | * | 6/1966 | Laing .............................. 237/8 |
| 3,849,893 A | * | 11/1974 | Ormsby ........................ 33/181 |
| 3,968,938 A | * | 7/1976 | Ruhl et al. ................ 241/101.1 |
| 4,235,293 A | * | 11/1980 | Ellis .............................. 171/17 |
| 4,325,163 A | | 4/1982 | Mattson et al. ................ 15/330 |
| 4,479,115 A | * | 10/1984 | Holzhauer ................... 340/611 |
| 4,694,528 A | * | 9/1987 | Comer et al. ................... 15/330 |
| 5,044,887 A | * | 9/1991 | Duthie et al. ........... 416/223 B |
| 5,245,726 A | | 9/1993 | Rote et al. ...................... 15/339 |
| 5,373,688 A | * | 12/1994 | Stanley et al. .............. 56/328.1 |
| 5,399,068 A | * | 3/1995 | Park ............................ 415/204 |
| 5,545,007 A | * | 8/1996 | Martin ..................... 415/173.2 |
| 5,586,359 A | | 12/1996 | Iida ............................... 15/339 |
| 5,601,400 A | * | 2/1997 | Kondo et al. ................. 415/119 |
| 5,772,711 A | * | 6/1998 | Kieffer ......................... 55/274 |
| 5,794,864 A | * | 8/1998 | Hammett et al. ............. 241/56 |

* cited by examiner

*Primary Examiner*—Charles G. Freay
*Assistant Examiner*—Timothy P. Solak
(74) *Attorney, Agent, or Firm*—Michael D. Bednarek; Shaw Pittman LLP

(57) ABSTRACT

A vacuum apparatus has a recessed portion which is provided at an appropriate position of a fan casing. When incoming materials frequently pass through the fan casing, the recessed portion wears more quickly than the rest of the inner surface of the fan casing. Hence, a user of the vacuum apparatus can easily know when to replace the fan casing by visually checking the recessed portion from outside the fan casing.

7 Claims, 3 Drawing Sheets

VACUUM APPARATUS AND FAN CASING WITH WEAR INDICATOR

BACKGROUND OF THE INVENTION

1. Field of the Invention

The present invention relates to a vacuum apparatus and, more particularly, to a vacuum cleaner used for cleaning up, for example, fallen leaves, wooden chips, and waste, and to a fan casing for the same.

2. Description of the Related Art

In a vacuum cleaner used for cleaning up fallen leaves, wooden chips, waste, and other items (U.S. Pat. No. 5,245, 726 is an example of such a device), incoming materials are passed through a fan casing while sliding against an inner surface of the fan casing; hence, the inner surface of the fan casing is apt to wear due to the contact with the incoming materials. If the fan casing is subjected to continued use for an extended period of time without being replaced at appropriate intervals, then the fan casing may incur serious damage or incoming materials may leak out, or other problems may arise during operation of the device.

SUMMARY OF THE INVENTION

Accordingly, the present invention has been made with a view toward solving the problems associated with the related art, and it is an object thereof to provide a vacuum apparatus that enables a user to easily check from outside a degree of wear on an inner surface of a fan casing that is caused by frictional contact with incoming materials so as to allow the user to easily know the appropriate time to replace the fan casing.

To this end, the present invention provides a vacuum apparatus equipped with a fan casing through which an incoming material passes, wherein an outer surface of the fan casing is provided with a recessed portion that extends toward the inner surface of the fan casing. The recessed portion has the appearance of a protrusion when viewed from inside the fan casing.

According to the present invention, if incoming materials frequently pass through the fan casing, then the recessed portion wears more quickly than the rest of the inner surface of the fan casing. Therefore, the user will be able to easily know when to replace the fan casing by visually checking the recessed portion from outside the fan casing. If the wear on the recessed portion advances until a hole finally opens in the recessed portion, then a noise (e.g. a whistle-like noise) that is different from normal operating noises will be produced, so that the time to replace the fan casing can be known audibly as well as visually.

In a preferred embodiment of the present invention, the depth of the recessed portion can be set so that an outer surface of the recessed portion reaches the inner surface of the fan casing, or the outer surface of the recessed portion is positioned farther inward than the inner surface of the fan casing.

Furthermore, the number of the protrusions is not limited to one; any appropriate number of recessed portions may be provided along the outer periphery of the fan casing.

DESCRIPTION OF THE PREFERRED EMBODIMENTS

Figure 1:
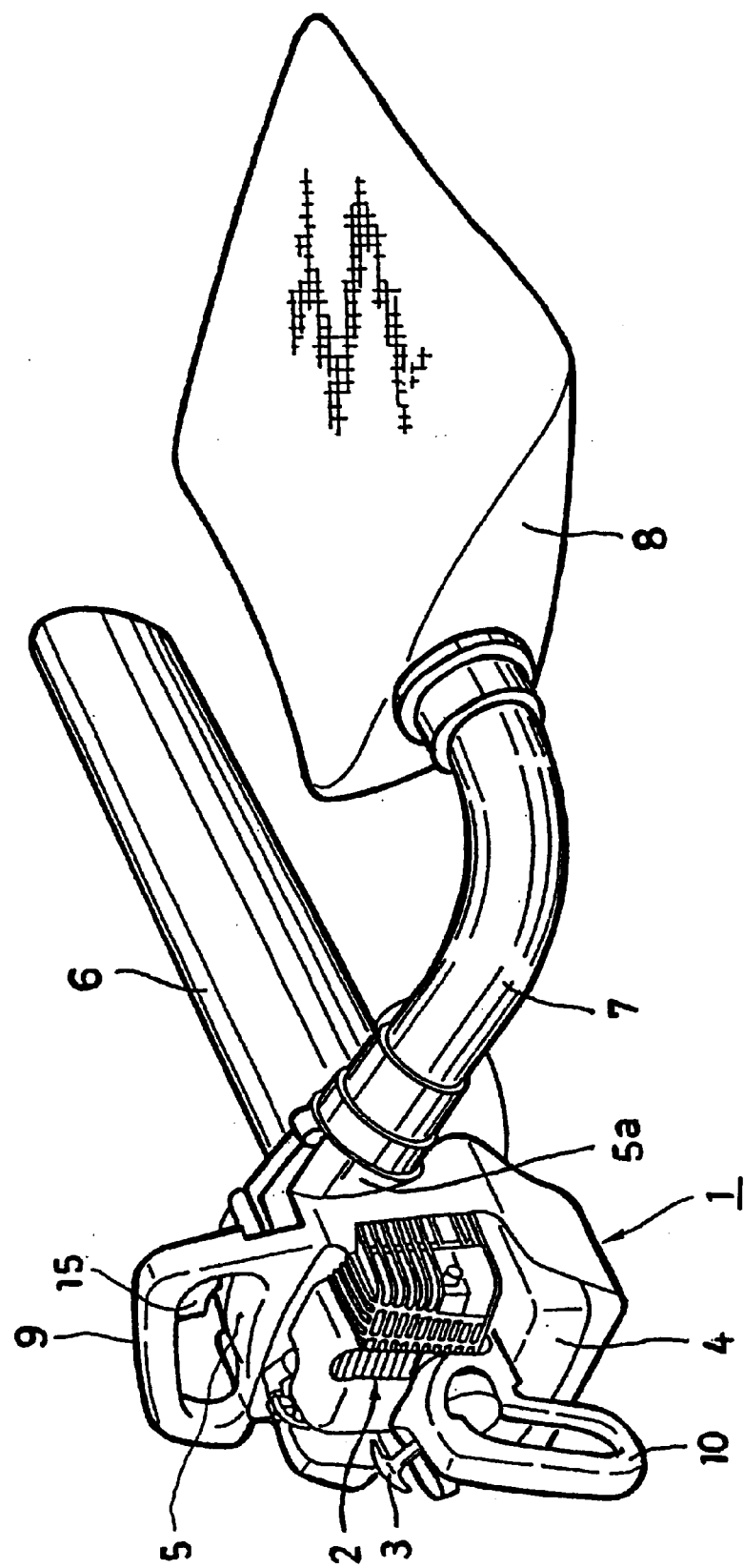
FIG. 1 is a perspective general view of a vacuum cleaner in accordance with an embodiment of the present invention.

As shown in FIG. 1, a vacuum apparatus in accordance with one embodiment of the present invention is a vacuum cleaner used for cleaning up fallen leaves, wood chips, waste, and other materials. A main body 1 of the vacuum apparatus is integrally equipped with an air-cooled two-cycle gasoline engine 2 working as a driving motor, a recoil starter 3 for starting the engine 2, a fuel tank 4, a fan casing 5, and operating handles 9 and 10 that provide grasping portions for an operator. The upper operating handle 9 is provided with an output control lever 15 for the engine 2. A suction pipe 6 is detachably coupled to an intake opening 5d of the fan casing 5, while a blowout pipe 7 is detachably coupled to an outlet opening 5a of the fan casing 5. A dust bag 8 having appropriate air permeability is detachably connected to a downstream or blowout end of the blowout pipe 7.

In the vacuum apparatus, the fan casing 5, the suction pipe 6, and the blowout pipe 7 are formed of, for example, a plastic constituent to minimize the weight of the apparatus.

Figure 2:
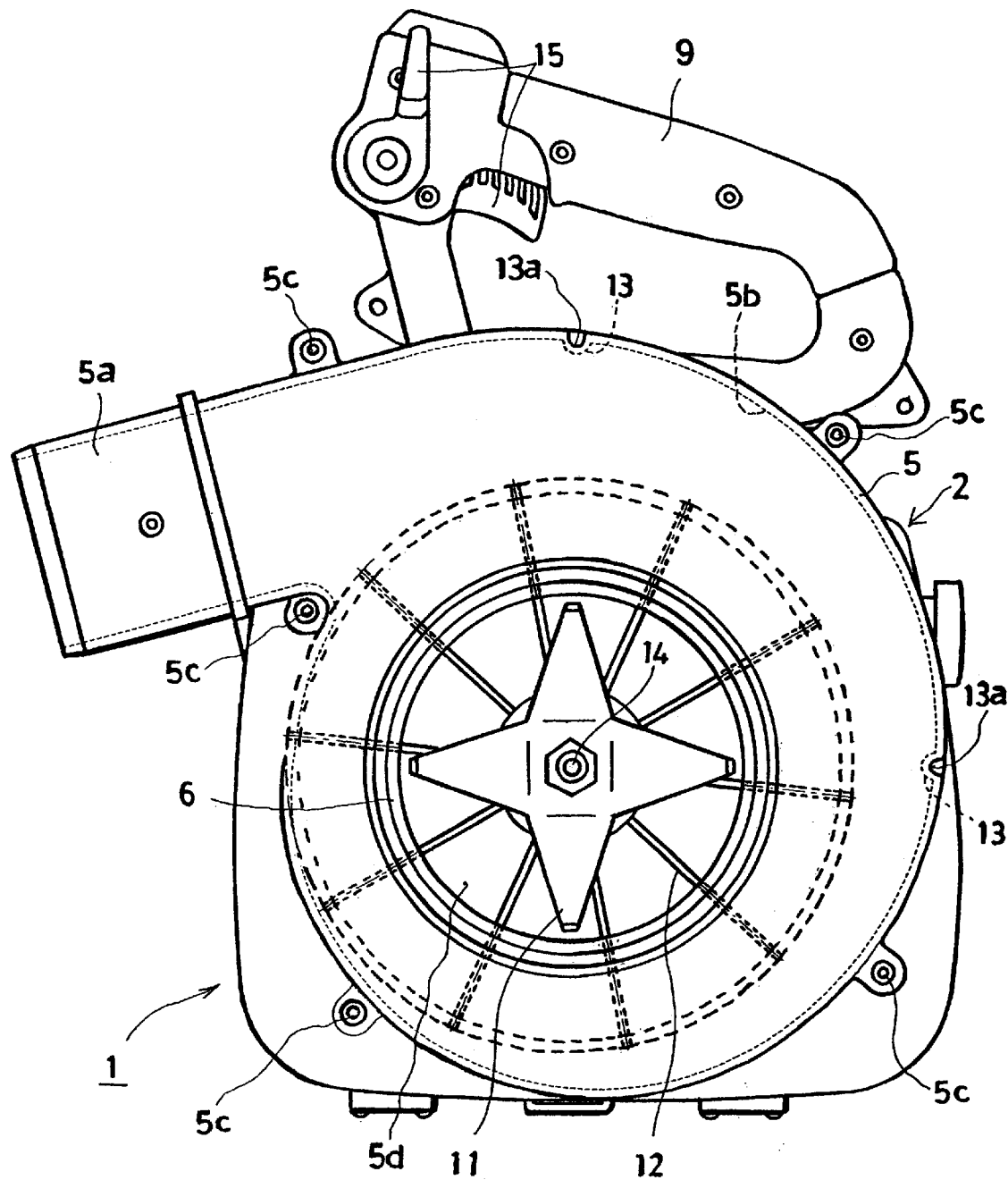
FIG. 2 is a front view showing a fan casing of the vacuum cleaner of FIG. 1.

Referring to FIG. 2, the fan casing 5 is removably attached to one side surface of the main body 1 by a plurality of attaching sections 5c provided along an outer periphery thereof. A cutter 11 and a fan 12 are positioned in the fan casing 5, and the cutter 11 and the fan 12 are also mounted on an output shaft 14 of the engine 2. The suction pipe 6 is detachably coupled to the intake opening 5d of the fan casing 5.

When the fan 12 rotates, incoming materials such as fallen leaves, wood chips, and waste are drawn into the fan casing 5 through the suction pipe 6, smashed by the cutter 11, guided in slidable contact with an inner surface 5b of the fan casing 5 that is smoothly curved, blown out through the blowout pipe 7, and accommodated in the dust bag 8.

In this embodiment, a recessed portion 13 that extends toward the inner surface 5b of the fan casing 5 is formed along the outer periphery of the fan casing 5. The recessed portion 13 is provided at a location in the fan casing 5 that is prone to be worn due to frictional contact with incoming materials. Preferably, an appropriate number of the recessed portions 13 are provided at appropriate locations, instead of providing just one.

Figure 3:
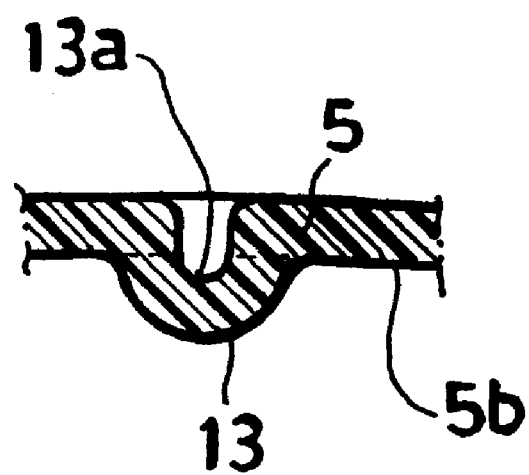
FIG. 3 is an enlarged sectional view of an essential section of the fan casing of FIG. 2.

As shown in an enlarged view of FIG. 3, an outer surface 13a (the surface facing the outside of the fan casing 5) of the recessed portion 13 extends inward, and beyond the inner surface 5b of the fan casing 5. In other words, the depth of the recessed portion 13 is set so that the outer surface 13a of the recessed portion 13 is positioned farther inward than the inner surface 5b of the fan casing 5.

Most incoming materials drawn into the fan casing 5 through the suction pipe 6 when the fan 12 rotates are fed from the intake opening 5d toward the outlet opening 5a while being held firmly in frictional contact with the inner surface 5b of the smoothly curved outer periphery of the fan casing 5 by a centrifugal force produced by the rotation of the fan 12. Therefore, in a prolonged use, the inner surface 5b of the fan casing 5 gradually wears from the frictional contact with the incoming materials. In this case, since the recessed portion 13 is provided in the fan casing 5 at a location prone to wear, the recessed portion 13 wears more quickly than other portions of the fan casing 5. As a result, the wall of the recessed portion 13 becomes thin, allowing the operator to visually check the degree of wear of the inner surface 5b easily from outside the fan casing 5. Generally, materials appear either lighter in color or more transparent as they become thinner due to wear. Thus, the operator can easily know the appropriate time to replace the fan casing 5.

Moreover, when the wear of the recessed portion 13 advances until a hole opens therein, then the hole will produce a noise (e.g. a whistle-like noise) that is different from normal operating noises, so that the proper time to replace the fan casing 5 can be known audibly as well as visually from outside the fan casing 5. An appropriate number of recessed portions 13 distributed at appropriate locations in the fan casing 5 permits more reliable check of wear.

The wall thickness, depth, and other characteristics of the recessed portion 13 may be set according to the desired replacement interval of the fan casing 5. If the foregoing whistling effect is not mandatory, then the outer surface 13a of the recessed portion 13 does not have to be deep enough to reach the inner surface 5b of the fan casing 5; the recessed portion 13 may have a depth that makes a thinner wall portion that corresponds to an allowable amount of wear. Alternatively, the recessed portion 13 may be filled with a transparent constituent such as a synthetic resin to prevent materials from exiting out of the holes created by a worn recessed portion 13 although this prevents the whistling effect.

What is claimed is:

1. A method for determining the wear on a fan casing adapted for use with a fan, the fan being located within the fan casing, the fan casing having an inner surface facing the fan and an opposite exterior surface facing away from the fan, a recessed portion having an inner surface facing the fan and an outer surface facing away from the fan, the recessed portion disposed on the fan casing and protruding into a fluid stream comprising the steps of:

(a) moving a fluid stream circumferentially around the fan casing causing the fluid stream to contact the recessed portion, resulting in the recessed portion wearing more quickly than other portions of the fan casing;

(b) visually observing the recessed portion from outside the fan casing and observing the outer surface of the fan casing to observe a difference in appearance between the outer surface of the recessed portion and the outer surface of the fan casing, whereby a user can determine the state of wear of the fan casing by observing the difference in appearance between the outer surface of the recessed portion and the outer surface of the fan casing.

2. The method according to claim 1, wherein the difference in appearance between the outer surface of the recessed portion and the outer surface of the fan casing ia a difference in color.

3. The method according to claim 2, wherein the difference in appearance is a difference in the shade of a color.

4. The method according to claim 1, further comprising the step of causing a fluid stream to contact the recessed portion until a hole opens in the fan casing proximate to the recessed portion that produces an audible noise.

5. The method according to claim 4, wherein the audible noise is different than a normal operating noise of the fan.

6. A method for determining the wear on a fan casing adapted for use with a fan, the fan being located within the fan casing, the fan casing having an inner surface facing the fan and an opposite exterior surface facing away from the fan, a recessed portion having an inner surface facing the fan and an outer surface facing away from the fan, the recessed portion disposed on the fan casing and protruding into a fluid stream comprising the steps of:

(a) moving a fluid stream circumferentially around the fan casing causing the fluid stream to contact the recessed portion, resulting the recessed portion to wear more quickly than other portions of the fan casing;

(b) causing a fluid stream to contact the recessed portion until a hole opens in the fan casing proximate to the recessed portion that produces an audible noise.

7. The method according to claim 6, wherein the audible noise is different than a normal operating noise of the fan.

* * * * *